Jan. 6, 1931.  W. N. GILBERT  1,788,020
SCALE
Filed May 21, 1929  2 Sheets-Sheet 1

FIG.I.

Inventor
Wm N. Gilbert
By his Attorney
W. M. Wilson

Jan. 6, 1931.  W. N. GILBERT  1,788,020
SCALE
Filed May 21, 1929   2 Sheets-Sheet 2

Patented Jan. 6, 1931

1,788,020

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

SCALE

Application filed May 21, 1929. Serial No. 364,799.

The present invention relates to weighing scales and more particularly to that type in which an indicator is controlled by means of a pinion and rack through the weight offset mechanism.

The main object of the invention consists in the provision of new and simple means for compensating the play between the indicator and its driving mechanism.

Another object of the invention is to provide a plurality of racks cooperating with the pinion of the indicator with opposite tendencies.

Among the further objects of the invention is the provision of new interconnecting means for a weight offset mechanism, particularly adapted for double pendulum scales.

Other objects and advantages will be hereinafter set forth in the accompanying specification and claims and illustrated in the drawings which show what is considered to be a preferred embodiment of the invention.

Figure 1:
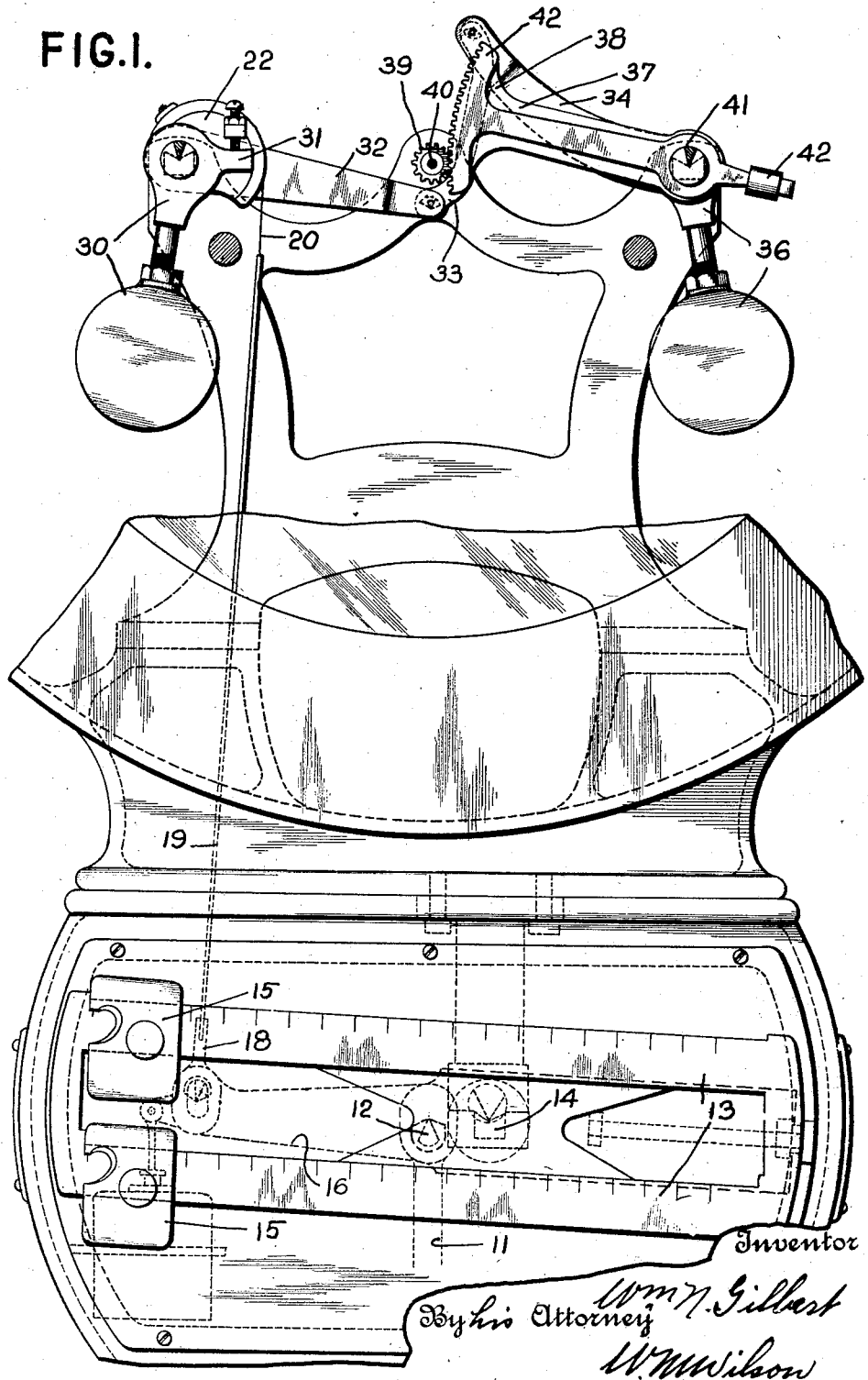
Fig. 1 shows the load offsetting and indicator portions of a weighing scale according to the present invention.
Figure 2:
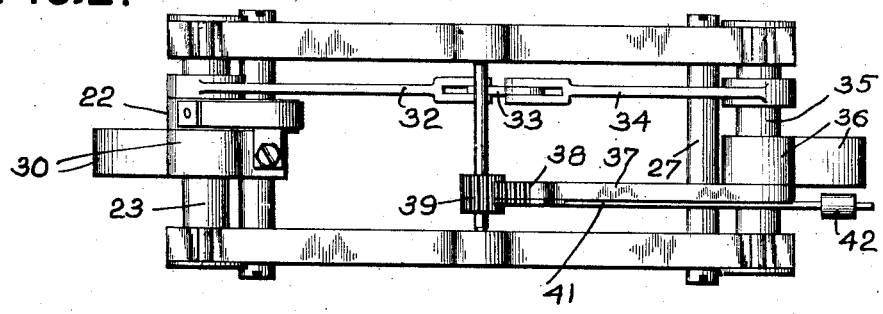
Fig. 2 is a top view of the weight offsetting and indicator driving mechanism.
Figure 3:
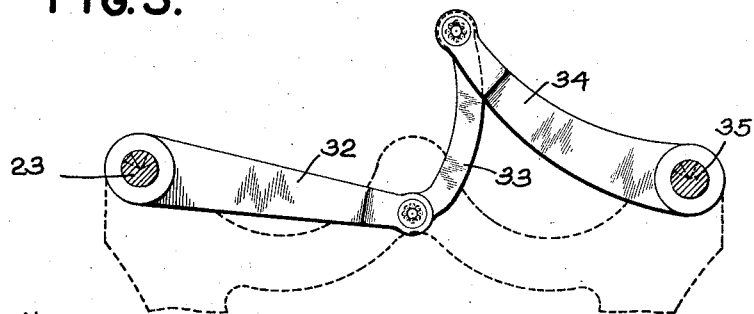
Fig. 3 shows a modification of the pendulum interconnecting means.
Figure 4:
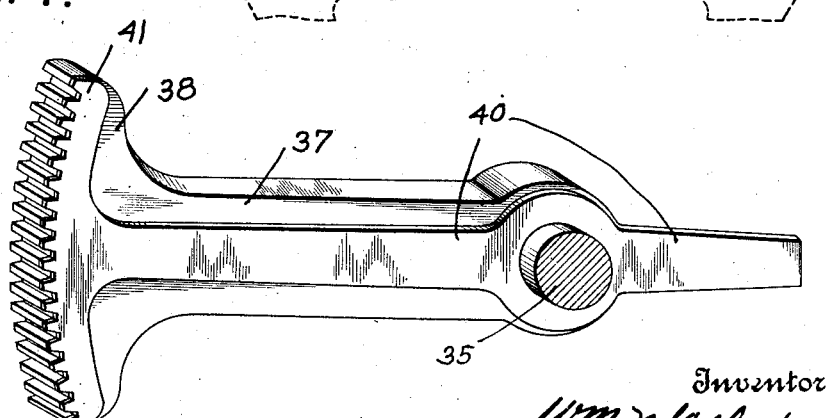
Fig. 4 is a detail to an enlarged scale of the indicator operating racks in Figs. 1 and 2.

The scale shown in Fig. 1 is of known type having a draft rod 11 which is operatively connected with the load support of the weighing scale. The draft rod 11 is pivoted at 12 to the weight beam 16 having its fulcrum at 14. A tare and capacity weight beam structure indicated at 13 is fastened to the beam 16 and provided with slidable poise weights 15 in the usual manner. The load counterbalancing mechanism consists of a pair of pivoted pendulums 30 and 36. The pivoted supporting structure for pendulum 30 has an adjustable cam 22 which is connected to the scale beam 16 through a stirrup 18 and a suitable tape 20 and rod 19 whereby the movement of the beam is transmitted to the pendulums. The pendulums 30 and 36 are interconnected through a linkage so that movement of one will cause corresponding movement of the other. The shaft 23 to which pendulum 30 is attached carries an arm 32 bifurcated at its free end and extending substantially in a horizontal direction. The shaft 35 of pendulum 36 carries a similar arm 34 which is curved as shown so as not to interfere with arm 32. The bifurcated ends of arms 32 and 34 are connected by a link 33 which may be pivoted to them either through knife edges as indicated in Fig. 1 or ball bearings as indicated in Fig. 3. The balls of pendulums 30 and 36 are preferably of the same weight and the lever arm of arms 32 and 34 of the same length so that the counterbalancing force of the system will be equally divided between the two pendulums.

The indicator arranged to cooperate with a scale dial in the usual manner is driven through a rack and pinion. This construction is a very troublesome one as even a slight back lash between the rack and pinion may cause considerable error in the scale reading. Furthermore the rack and pinion drive must be easy so as not to impose any appreciable additional load on the counterbalancing mechanism. According to the present invention an indicator drive is provided which is free of back lash but which nevertheless is free in its movements. The indicator (not shown) is driven by a pinion 39. This pinion meshes with and is driven by a segmental rack 38 formed on an arm 37 fixed to shaft 35 of pendulum 36. A thin rack 41 whose teeth correspond in contour to those of rack 38 is freely mounted on shaft 35 and a small counterweight 42 tends to turn this rack clockwise as viewed in Fig. 1. Racks 36 and 38 both mesh with pinion 39 and owing to the tendency of rack 41 to clockwise movement with respect to rack 38 the pinion teeth mesh accurately with the rack system with substantially no back lash while owing to the lightness of rack 41 and its counterweight 42 there is no binding action between the pinion and its racks.

Having now described a preferred form of the invention what is claimed is:

1. In a weighing scale, a load controlled weight offset mechanism including a plurality of pendulum units, each pendulum unit having an arm, rigid interconnecting means between said arms, a rotatable indicating device having a pinion, a rack associated with one of said pendulum units and meshing with said pinion to move it in accordance with the load and means to constantly urge said pinion to move independently of the load.

2. A mechanism according to claim 1 wherein said last-named means comprises an unequally balanced auxiliary rack member in juxtaposition to said rack and also meshing with the pinion.

In testimony whereof I hereto affix my signature.

WILLIAM N. GILBERT.